(12) United States Patent
Shigihara

(10) Patent No.: US 10,773,660 B2
(45) Date of Patent: Sep. 15, 2020

(54) VEHICLE BODY FLOOR STRUCTURE

(71) Applicant: Toyota Jidosha Kabushiki Kaisha, Toyota-shi, Aichi-ken (JP)

(72) Inventor: Takayoshi Shigihara, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 51 days.

(21) Appl. No.: 16/196,782

(22) Filed: Nov. 20, 2018

(65) Prior Publication Data

US 2019/0168690 A1 Jun. 6, 2019

(30) Foreign Application Priority Data

Dec. 5, 2017 (JP) .................. 2017-233165

(51) Int. Cl.
*B60R 13/08* (2006.01)
*B62D 25/20* (2006.01)

(52) U.S. Cl.
CPC ............ *B60R 13/083* (2013.01); *B62D 25/20* (2013.01)

(58) Field of Classification Search
CPC .................................................. B60R 13/083
USPC .............................. 296/187.08, 193.07, 39.3
See application file for complete search history.

(56) References Cited

U.S. PATENT DOCUMENTS

| | | | |
|---|---|---|---|
| 2,126,607 A * | 8/1938 | Boehner | B62D 21/10 280/797 |
| 4,898,419 A * | 2/1990 | Kenmochi | B62D 21/10 296/191 |
| 7,025,412 B2 * | 4/2006 | Nakamura | B62D 21/157 296/193.07 |
| 2005/0285432 A1 | 12/2005 | Sugihara et al. | |
| 2010/0113627 A1 | 5/2010 | Matsumoto et al. | |
| 2012/0067980 A1 | 3/2012 | Iwano et al. | |

FOREIGN PATENT DOCUMENTS

| | | |
|---|---|---|
| CN | 203666796 U | 6/2014 |
| EP | 1686043 A1 | 8/2006 |
| EP | 1712454 A1 | 10/2006 |
| JP | H10-086728 A | 4/1998 |
| JP | 2002-046552 A | 2/2002 |
| JP | 2005-165152 A | 6/2005 |
| JP | 2006-007862 A | 1/2006 |
| JP | 2006-315627 A | 11/2006 |
| JP | 2009-286249 A | 12/2009 |

(Continued)

*Primary Examiner* — Joseph D. Pape

(74) *Attorney, Agent, or Firm* — Dinsmore & Shohl LLP

(57) ABSTRACT

A vehicle body floor structure includes: a plurality of first vehicle body framework members extending along a vehicle body front-rear direction; a plurality of second vehicle body framework members extending along a vehicle width direction; a floor panel to which each of the first vehicle body framework members and the second vehicle body framework members is joined; and a vibration damping material that is applied to a surface of the floor panel. The floor panel includes a plurality of steps having ridge lines extending along a short-side direction of a first region. The first region is surrounded by the first vehicle body framework members and the second vehicle body framework members. The vibration damping material is applied along at least one outer edge portion of the first region.

15 Claims, 11 Drawing Sheets

(56) References Cited

FOREIGN PATENT DOCUMENTS

| | | |
|---|---|---|
| JP | 2010-111746 A | 5/2010 |
| JP | 2010-274168 A | 12/2010 |
| JP | 2017-165174 A | 9/2017 |

* cited by examiner

1

VEHICLE BODY FLOOR STRUCTURE

CROSS-REFERENCE TO RELATED APPLICATIONS

This application claims priority to Japanese Patent Application No. 2017-233165 filed on Dec. 5, 2017, which is incorporated herein by reference in its entirety including the specification, drawings and abstract.

BACKGROUND

1. Technical Field

The present disclosure relates to a vehicle body floor structure. More particularly, the present disclosure relates to a measure tor suppressing vibration occurring in a floor panel.

2. Description of Related Art

As disclosed in Japanese Patent Application Publication No. 2909-286249 (JP 2009-286249 A), a floor panel of a vehicle body has welded thereon vehicle body framework members, such as frames extending along a vehicle body front-rear direction and cross members extending along a vehicle width direction.

When the vehicle body vibrates as a result of an input from a road surface into the vehicle body, transmission of vibration from the engine, etc., and the frequency of this vibration of the vehicle body matches the resonance frequency of the floor panel, the floor panel resonates and generates abnormal noise (low-frequency solid-borne sound), such as booming noise, giving an uncomfortable feeling to an occupant.

It has been proposed to enhance the rigidity of a floor panel as means for suppressing generation of such abnormal noise accompanying resonance of the floor panel. For example, JP 2009-286249 A discloses a structure in which triangular flat surfaces are combined at angles so as to form protrusions on a floor panel. This structure suppresses generation of the abnormal noise by allowing the resonance frequency of the floor panel to be set higher without causing an increase in the plate thickness of the floor panel.

On the other hand, Japanese Patent Application Publication No. 2006-7862 discloses a technique of damping vibration occurring in a floor panel by coating substantially the entire upper surface of the floor panel evenly with a vibration damping material.

SUMMARY

While setting the resonance frequency of a floor panel higher or damping vibration occurring in a floor panel by a vibration damping material as described above is effective in suppressing generation of the abnormal noise, optimal structure for combining these techniques has not yet been proposed. The inventor of the present disclosure has considered a structure that combines these techniques and can thereby effectively suppress vibration occurring in a floor panel.

The present disclosure provides a vehicle body floor structure that combines the technique of setting the resonance frequency of a floor panel higher by enhancing the rigidity of the floor panel and the technique of damping vibration occurring in a floor panel by applying a vibration damping material to the floor panel, and that can thereby effectively suppress vibration occurring in the floor panel.

A first aspect of the present disclosure provides a vehicle body floor structure. The vehicle body floor structure includes: a plurality of first vehicle body framework members extending along a vehicle body front-rear direction; a plurality of second vehicle body framework members extending along a vehicle width direction; a floor panel to which each of the first vehicle body framework members and the second vehicle body framework members is joined; and a vibration damping material applied to a surface of the floor panel. The floor panel includes a plurality of steps having ridge lines extending along a short-side direction of a first region. The steps are arrayed along a long-side direction of the first region. The first region is surrounded by the first vehicle body framework members that are adjacent to each other in the vehicle width direction and the second vehicle body framework members that are adjacent to each other in the vehicle body front-rear direction. The vibration damping material is applied along at least one outer edge portion of the first region among outer edge portions extending along the long-side direction and outer edge portions extending along the short-side direction.

According to the first aspect, the floor panel is provided with the steps, which allows the resonance frequency of the floor panel to be set higher by enhancing the rigidity of the floor panel. Moreover, the vibration damping material is applied to the surface of the floor panel along at least one outer edge portion of the region of the floor panel surrounded by the vehicle body framework members, among the outer edge portions extending along the long-side direction and the outer edge portions extending along the short-side direction, so that the vibration damping function of the vibration damping material can be effectively exerted. Specifically, the principle of vibration damping by the vibration damping material is that the vibration damping material exerts the damping function by stretching when the floor panel vibrates and deforms. It is the outer edge portions of the region surrounded by the vehicle body framework members that undergo a large change in the curvature of bending deformation in a cross-section of the floor panel while the floor panel is vibrating. These outer edge portions are namely the outer edge portions of the region extending along the long-side direction and the outer edge portions thereof extending along the short-side direction. Therefore, if the vibration damping material has been applied along these outer edge portions (at least one outer edge portion among the outer edge portions), this means that the vibration damping material has been applied to the surface of the portions that undergo a large change in the curvature of bending deformation in a cross-section of the floor panel during vibration of the floor panel, so that the vibration damping function of the vibration damping material can be effectively exerted. Thus, it is possible to sufficiently suppress vibration of the floor panel, while reducing the amount of vibration damping material used compared with when the vibration damping material is applied evenly over the entire floor panel.

In the floor structure for a vehicle of the first aspect, the vibration damping material may be applied along only the outer edge portions of the first region extending along the long-side direction.

According to the above configuration, the steps of the floor panel having the ridge lines extending along the short-side direction of the region surrounded by the vehicle body framework members are arrayed along the long-side direction of the region. Accordingly, during vibration of the floor panel, a central portion of the step in the short-side direction (the short-side direction of the region) undergoes a relatively small change in the curvature of beading deformation, while portions of the step at both ends in the short-side direction (outer edge portions extending along the long-side direction) undergo a relatively large change in the curvature of bending deformation. Thus, these outer edge portions extending along the long-side direction constitute portions that undergo the largest change in the curvature of bending deformation in a cross-section of the floor panel. According to the solution of the present disclosure, the vibration clamping material is applied to the surface of the floor panel along only these outer edge portions extending along the long-side direction, which means that the vibration damping material is applied to the surfaces of only those portions that undergo the largest change in the curvature of bending deformation in a cross-section of the floor panel. In other words, portions that undergo the largest change in the curvature of bending deformation are proactively created as the floor structure for a vehicle, and the vibration damping material is applied to these portions. Thus, it is possible to sufficiently suppress vibration of the floor panel by exerting a sufficient vibration damping function, while significantly reducing the amount of vibration damping material used.

In the floor structure for a vehicle of the first aspect, the vibration damping material may include a first vibration damping material and a second vibration damping material. The thickness of the first vibration damping material may be set to be larger than the thickness of the second vibration damping material. The first vibration damping material may be applied to a surface of the floor panel along each of the outer edge portions extending along the long-side direction and the outer edge portions extending along the short-side direction of the first region of the floor panel. The second vibration damping material may be applied to a surface of the floor panel at a central portion of the first region of the floor panel.

According to this configuration, as in the above-described case, a larger amount of vibration damping material is applied to the surface of the portions that undergo a large change in the curvature of bending deformation in a cross-section of the floor panel dating vibration of the floor panel, so that the vibration damping function of the vibration damping material can be effectively exerted. Moreover, the vibration damping material is applied also to the central portion of the region, and thus the vibration damping function of the vibration damping material can be exerted also at the central portion of the region.

In the floor structure for a vehicle of the first aspect, the ridge lines of the steps may continue from one outer edge portion of the first region extending along the long-side direction to the other outer edge portion of the first region extending along the long-side direction.

In the floor structure for a vehicle of the first aspect, the steps may include a plurality of steep parts, a plurality of panel parts, and a plurality of upright parts. The steep parts may have a larger inclination angle relative to a horizontal direction than the panel parts. The panel parts may be each laid between the steep parts and have a smaller inclination angle relative to the horizontal direction than the steep parts. The upright parts may be located between edges of the panel parts at both ends in the vehicle width direction and a surface of the floor panel.

In the floor structure for a vehicle of the first aspect, the vibration damping material may be applied to the upright parts.

In the floor structure for a vehicle of the first aspect, a second region may be surrounded by the first vehicle body framework members that are adjacent to each other in the vehicle width direction and the second vehicle body framework members that are adjacent to each other in the vehicle body front-rear direction. The second region may be different region from the first region. The shape of an application region to which the vibration damping material is applied in the second region may be different from the shape of an application region to which the vibration damping material is applied in the first region.

In the present disclosure, the steps having the ridge lines extending along the short-side direction of the region surrounded by the vehicle body framework members are provided in the floor panel so as to be arrayed along the long-side direction of the region, and moreover, the vibration damping material is applied to the surface of the floor panel along the outer edge portions of the region. Thus, the rigidity of the floor panel is enhanced and the resonance frequency of the floor panel can be thereby set higher. Moreover, the vibration damping function of the vibration damping material can be effectively exerted. It is therefore possible to sufficiently suppress vibration of the floor panel, while reducing the amount of vibration damping material used compared with when the vibration damping material is applied evenly over the entire floor panel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below based on the drawings.

Floor Panel and Vehicle Body Structure around Floor Panel

Figure 1:
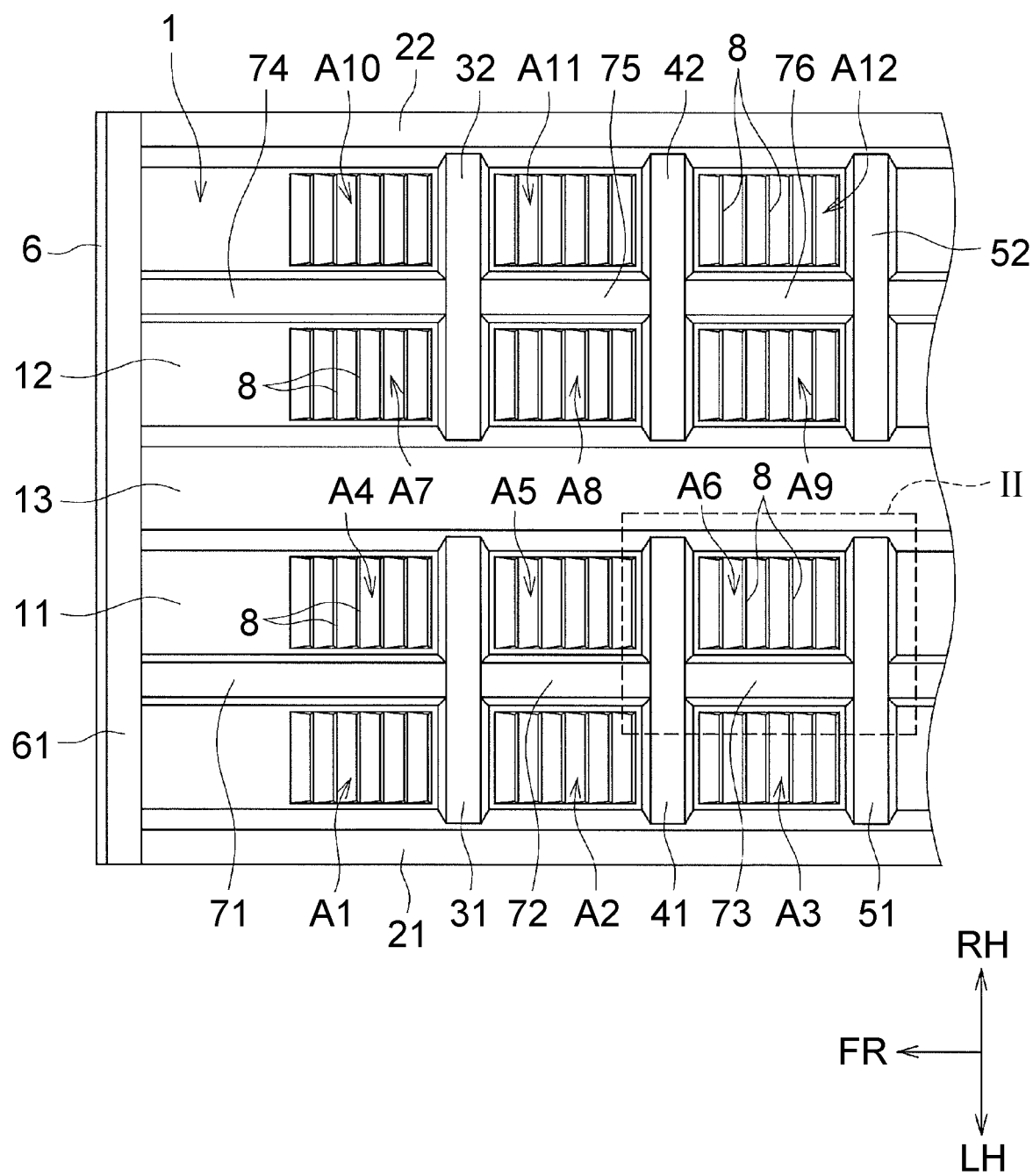
FIG. 1 is a plan view showing a floor panel according to an embodiment and a vehicle body structure around the floor panel.

FIG. 1 is a plan view showing a floor panel 1 according to the embodiment and a vehicle body structure around the floor panel 1. In FIG. 1, arrows FR, LH, and RH indicate a vehicle body frontward direction, a vehicle body leftward direction, and a vehicle body rightward direction, respectively.

As shown in FIG. 1, the vehicle body structure including the floor panel 1 according to the embodiment is provided with rockers 22, 21 that extend under a vehicle body along a vehicle body front-rear direction, respectively on right and left sides of the vehicle body. The floor panel 1 constituting a lower part of a vehicle cabin is joined at ends on an outer side in a vehicle width direction to surfaces of the rockers 21, 22 on an inner side in the vehicle width direction.

The floor panel 1 has floor sections 11, 12 located respectively on both sides in the vehicle width direction, and a tunnel 13 located at the center in the vehicle width direction. The tunnel 13 protrudes upward to a predetermined level relative to the right and left floor sections 12, 11. The tunnel 13 has a substantially U-shaped cross-section opening toward a vehicle body lower side.

First floor cross members 31, 32 extending along the vehicle width direction are respectively joined to an upper surface of the left floor section 11 and an upper surface of the right floor section 12 of the floor panel 1. The first floor cross members 31, 32 each have a hat-shaped cross-section opening downward, and ends of the first floor cross members 31, 32 on the outer side in the vehicle width direction are respectively joined to the surfaces of the rockers 21, 22 on the inner side in the vehicle width direction while ends thereof on the inner side in the vehicle width direction are respectively joined to outer surfaces of the tunnel 13.

Farther on a vehicle body rear side than the first floor cross members 31, 32, second floor cross members 41, 42 extending along the vehicle width direction are respectively joined to the upper surface of the left floor section 11 and the upper surface of the right floor section 12 of the floor panel 1. Like the first floor cross members 31, 32, the second floor cross members 41, 42 each have a hat-shaped cross-section opening downward, and ends of the second floor cross members 41, 42 on the outer side in the vehicle width direction are respectively joined to the surfaces of the rockers 21, 22 on the inner side in the vehicle width direction while ends thereof on the inner side in the vehicle width direction are respectively joined to the outer surfaces of the tunnel 13.

Farther on the vehicle body rear side than the second floor cross members 41, 42, central floor cross members 51, 52 extending along the vehicle width direction are respectively joined to the upper surface of the left floor section 11 and the upper surface of the right floor section 12 of the floor panel 1. Like the first floor cross members 31, 32, the central floor cross members 51, 52 each have a hat-shaped cross-section opening downward, and ends of the central floor cross members 51, 52 on the outer side in the vehicle width direction are respectively joined to the surfaces of the rockers 21, 22 on the inner side in the vehicle width direction while ends thereof on the inner side in the vehicle width direction are respectively joined to the outer surfaces of the tunnel 13.

Farther on a vehicle body front side than the first floor cross members 31, 32, a dashboard lower cross member 61 constituting a lower end of a dashboard panel 6 that separates the vehicle cabin and an engine compartment from each other is joined along a front end of the left floor section 11 and a front end of the right floor section 12.

First to sixth floor reinforcement upper members 71 to 76 extending along the vehicle body front-rear direction are joined to regions between the tunnel 13 and the rockers 21, 22 in the upper surfaces of the left floor section 11 and the right floor section 12 of the floor panel 1.

The floor reinforcement upper members 71 to 76 each have a hat-shaped cross-section opening downward and are joined to the upper surfaces of the left floor section 11 and the right floor section 12.

Specifically, the first floor reinforcement upper member 71 to the third floor reinforcement upper member 73 are joined to the upper surface of the left floor section 11. A front end and a rear end of the first floor reinforcement upper member 71 are respectively joined to the dashboard lower cross member 61 and the first floor cross member 31. A front end and a rear end of the second floor reinforcement upper member 72 are respectively joined to the first floor cross member 31 and the second floor cross member 41. A front end and a rear end of the third floor reinforcement upper member 73 are respectively joined to the second floor cross member 41 and the center floor cross member 51. The fourth floor reinforcement upper member 74 to the sixth floor reinforcement upper member 76 are joined to the upper surface of the right floor section 12. A front end and a rear end of the fourth floor reinforcement upper member 74 are respectively joined to the dashboard lower cross member 61 and the first floor cross member 32. A front end and a rear end of the fifth floor reinforcement upper member 75 are respectively joined to the first floor cross member 32 and the second floor cross member 42. A front end and a rear end of the sixth floor reinforcement upper member 76 are respectively joined to the second floor cross member 42 and the central floor cross member 52.

In addition, floor reinforcement lower members (not shown) are joined to lower surfaces of the left floor section 11 and the right floor section 12, at positions corresponding to the floor reinforcement upper members 71 to 76. These floor reinforcement lower members each have a hat-shaped cross-section opening upward and are joined to the lower surfaces of the left floor section 11 and the right floor section 12.

Structure of Steps of Floor Panel

As one feature of the embodiment, a plurality of steps 8 is formed in the floor panel 1. The steps 8 will be specifically described below.

Figure 2:
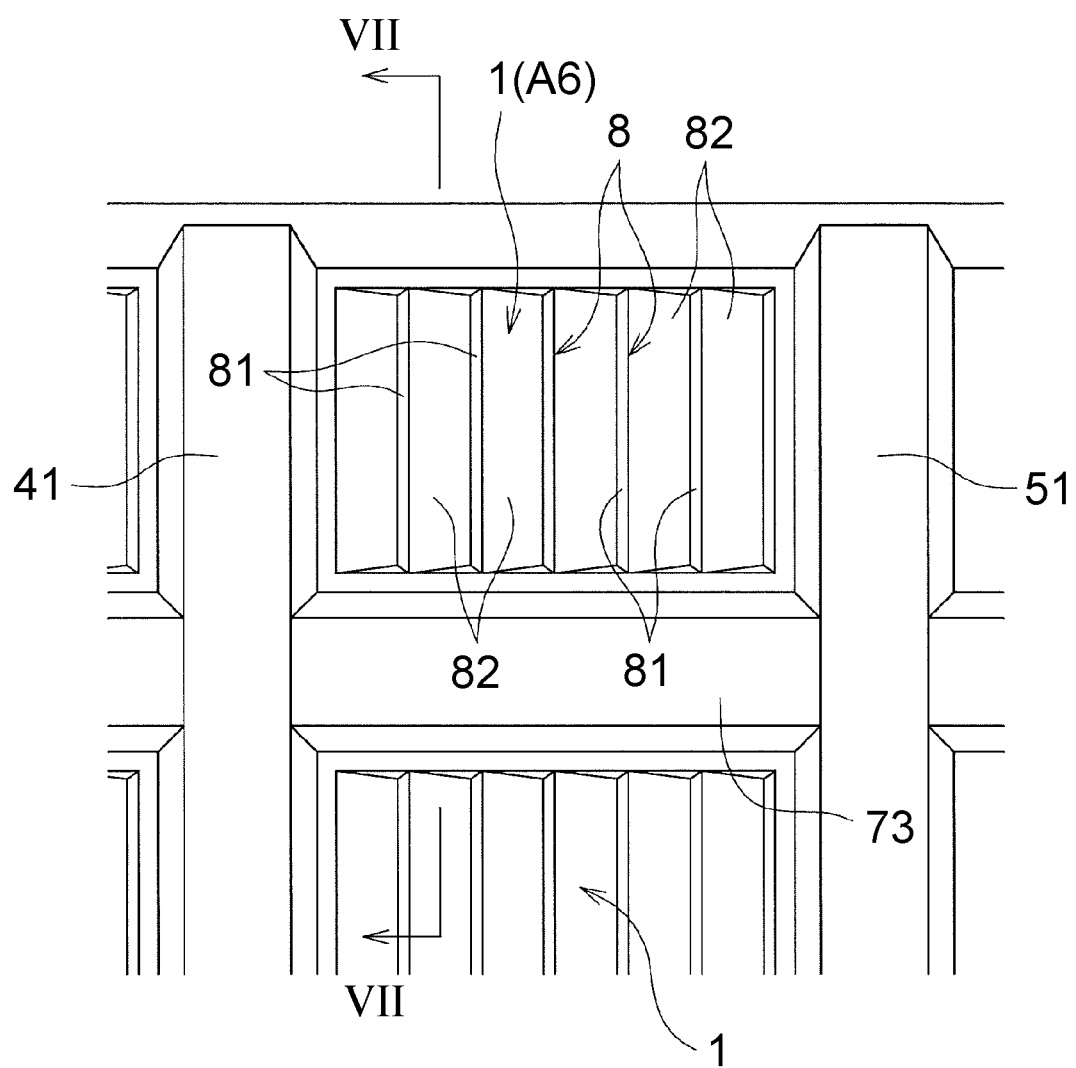
FIG. 2 is an enlarged plan view showing a part of the floor panel according to the embodiment.
Figure 3:
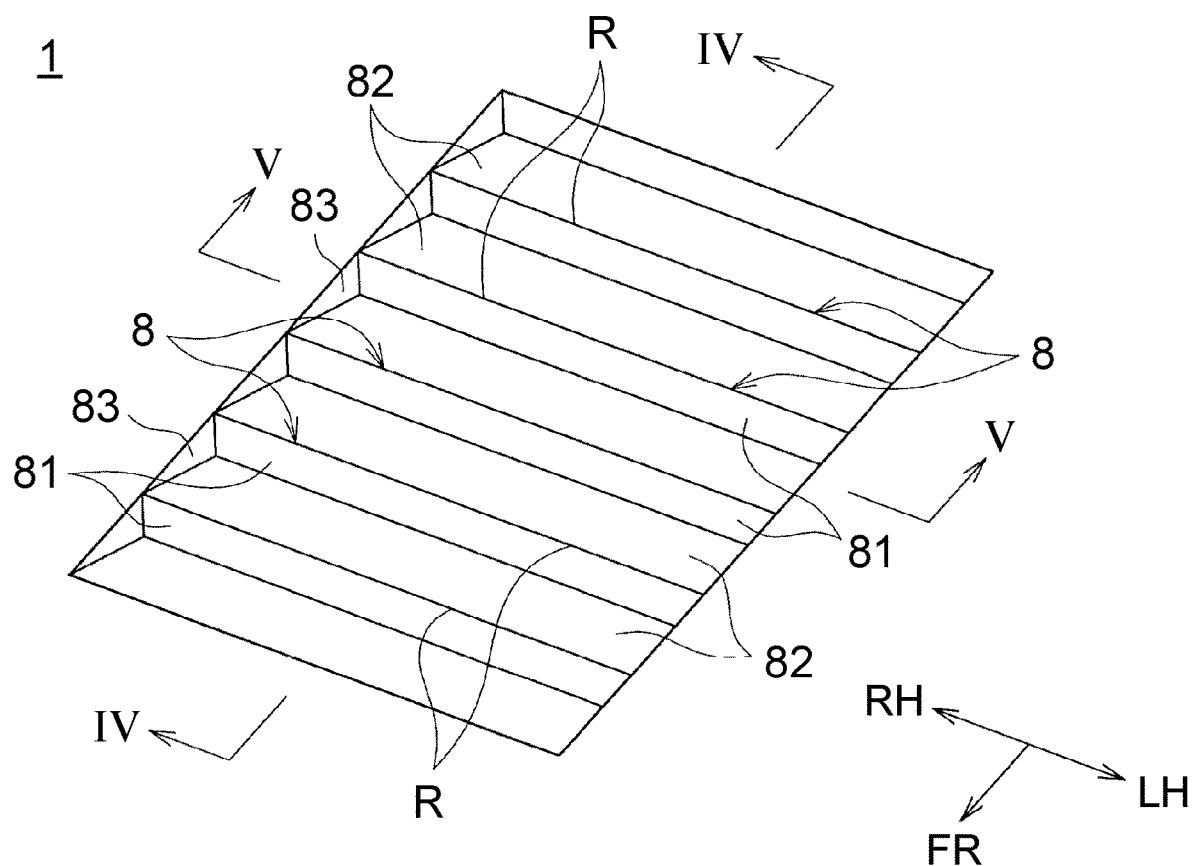
FIG. 3 is a perspective view schematically showing the structure of a part of the floor panel according to the embodiment.
Figure 4:
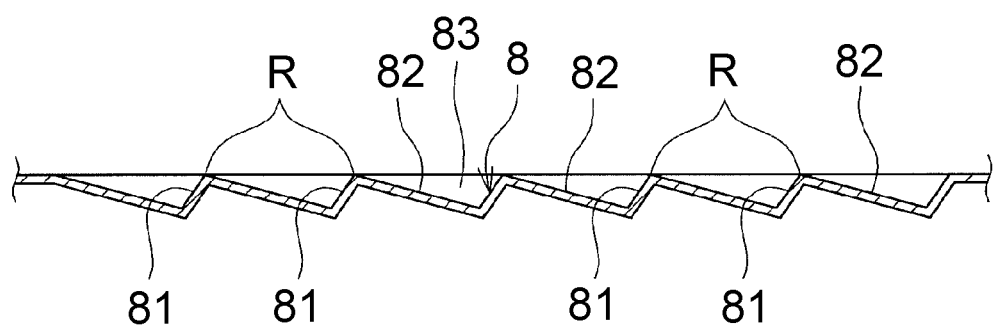
FIG. 4 is a view of section IV-IV in FIG. 3.
Figure 5:
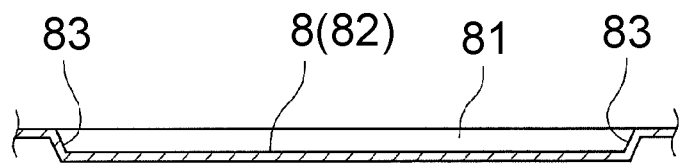
FIG. 5 is a view of section V-V in FIG. 3.

FIG. 2 is an enlarged plan view of a part of the floor panel 1. In FIG. 2, the part surrounded by dashed line II in FIG. 1 is enlarged. FIG. 3 is a perspective view schematically showing the structure of a part of the floor panel 1. In FIG. 3, arrows FR, LH, and RH indicate the vehicle body frontward direction, the vehicle body leftward direction, and the vehicle body rightward direction, respectively. FIG. 4 is a view of section IV-IV in FIG. 3. FIG. 5 is a view of section V-V in FIG. 3.

As shown in these drawings, regions A1 to A12 of the floor panel 1 surrounded by the above-described vehicle body framework members, such as the tunnel 13, the rockers 21, 22, the floor cross members 31, 32, 41, 42, 51, 52, 61, the floor reinforcement upper members 71 to 76, and the floor reinforcement lower members, are substantially rectangular regions. The tunnel 13, the rockers 21, 22, the floor reinforcement upper members 71 to 76, and the floor reinforcement lower members correspond to the "vehicle body framework members extending along the vehicle body front-rear direction" in the present disclosure. The floor cross members 31, 32, 41, 42, 51, 52, 61 correspond to the "vehicle body framework members extending along the vehicle width direction" in the present disclosure.

For these vehicle body framework members, interval dimensions between the vehicle body framework members that are adjacent to each other in the vehicle body front-rear direction (e.g., interval dimensions between the dashboard lower cross member 61 and the first floor cross members 31, 32; interval dimensions between the first floor cross members 31, 32 and the second floor cross members 41, 42; and interval dimensions between the second floor cross members 41, 42 and the central floor cross members 51, 52) are larger than interval dimensions between the vehicle body framework members that are adjacent to each other in the vehicle width direction (e.g., interval dimensions between the rockers 21, 22 and the floor reinforcement upper members 71 to 76, and interval dimensions between the floor reinforcement upper members 71 to 76 and the tunnel 13). Accordingly, the regions A1 to A12 have substantially rectangular shapes with a short-side direction oriented in the vehicle width direction and a long-side direction oriented in the vehicle body front-rear direction.

The steps 8 are formed in each of the regions A1 to A12 by bending a panel material constituting the floor panel 1. Specifically, the steps 8 are formed by bending downward the panel material constituting the floor panel 1, and have ridge lines R (see FIG. 3 and FIG. 4) extending along the short-side direction of the regions A1 to A12 (the vehicle width direction in the embodiment). These steps 8 are arrayed along the long-side direction of the regions A1 to A12 (the vehicle body front-rear direction in the embodiment). The ridge lines R of the steps 8 continue from one outer edge portion of the regions A1 to A12 extending along the long-side direction to the other outer edge portion of the regions A1 to A12 extending along the long-side direction. FIG. 2 to FIG. 4 show the structure of the region A6 that is provided with six steps 8 arrayed along the long-side direction. Specifically, the steps 8 have a plurality of steep parts 81 of which the angle relative to a horizontal direction (inclination angle) is set to be relatively large, and a plurality of panel parts 82 which is each laid between the steep parts 81 and of which the angle relative to the horizontal direction (inclination angle) is set to be relatively small. For example, the ratio between the width dimensions of the steep part 81 and the panel part 82 (the length dimension of an inclined surface of the steep part 81 and the length dimension of an inclined surface of the panel part 82) is set to 1:4. The ratio is not limited to this value but can be set arbitrarily. Reference signs 83 in FIG. 3 to FIG. 5 denote upright parts between edges of the panel parts 82 at both ends in the vehicle width direction and the upper surface of the floor panel 1 (the surface to which the floor reinforcement upper members 71 to 76 are joined).

With such steps 8 formed in each of the regions A1 to A12, the rigidity of the entire floor panel 1 is enhanced compared with when the entire regions have a flat plate shape, and the resonance frequency of the floor panel 1 is thereby set higher.

Coating Regions of Vibration Damping Material in Floor Panel

As another feature of the embodiment, predetermined regions of the floor panel 1 are coated with a vibration damping material 9 (the vibration damping material 9 is applied to predetermined regions). When the floor panel 1 is coated with the vibration damping material 9, the vibration damping material 9 serves to damp any vibration that occurs in the floor panel 1. The material of the vibration damping material 9 and the coating method of the vibration damping material 9 are publicly known (e.g., made public by Japanese Patent Application Publication No. 2010-274168 and Japanese Patent Application Publication No. 2010-111746), and therefore will not be described here.

Figure 6A:
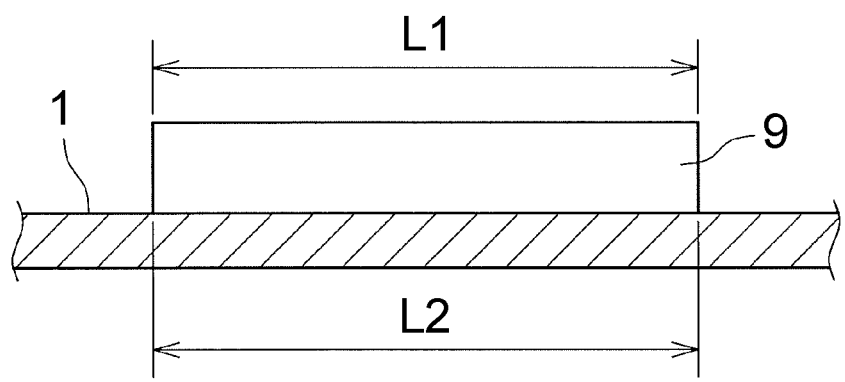
FIG. 6A is a schematic view illustrating the principle of vibration damping by a vibration damping material.
Figure 6B:
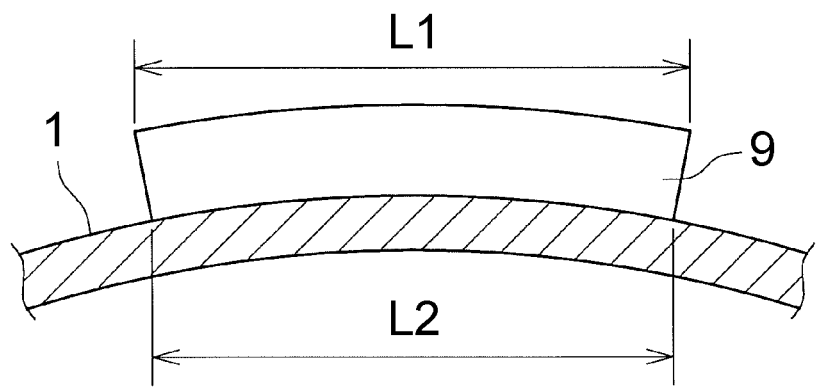
FIG. 6B is a schematic view illustrating the principle of vibration damping by the vibration damping material.

Here, the principle of vibration damping by the vibration damping material 9 will be described. FIG. 6A and FIG. 6B are schematic views illustrating the principle of vibration damping by the vibration damping material 9. FIG. 6A shows a case where no vibration is occurring in a flat plate-shaped floor panel 1 of which the upper surface is coated with the vibration damping material 9. FIG. 6B shows a case where vibration is occurring in the floor panel 1 of which the upper surface is coated with the vibration damping material 9 (a case where the floor panel 1 has undergone bending deformation so as to protrude upward as a result of vibration).

When no vibration is occurring in the floor panel 1, a width dimension L1 of an upper surface of the vibration damping material 9 and a width dimension L2 of a lower surface of the vibration damping material 9 are equal as shown in FIG. 6A. On the other hand, when vibration occurs in the floor panel 1 and the floor panel 1 undergoes bending deformation so as to protrude upward, the width dimension L1 of the upper surface of the vibration damping material 9 becomes larger than the width dimension L2 of the lower surface of the vibration damping material 9 as shown in FIG. 6B. Thus, an upper surface side of the vibration damping material 9 is stretched. A resisting force against this stretching occurs in the vibration damping material 9, and this resisting force acts as a force that suppresses bending deformation of the floor panel 1, so that the amount of bending deformation of the floor panel 1 is restricted. Thus, this resisting force acts as a damping force on vibration of the floor panel 1. Vibration of the floor panel 1 is thereby suppressed. A larger damping force is generated as the difference between the width dimension L1 of the upper surface of the vibration damping material 9 and the width dimension L2 of the lower surface thereof is larger. Also when the floor panel 1 undergoes bending deformation so as to protrude downward as a result of vibration, a resisting force occurring in the vibration damping material 9 acts as a force that suppresses the bending deformation of the floor panel 1, so that the amount of bending deformation of the floor panel 1 is restricted and vibration of the floor panel 1 is suppressed. Also in this case, a larger damping force is generated as the difference between the width dimension L1 of the upper surface of the vibration damping material 9 and the width dimension L2 of the lower surface thereof is larger.

Therefore, to effectively exert the vibration damping function of the vibration, damping material 9 by generating a large damping force of the vibration damping material 9, it is effective to coat with the vibration damping material 9 the surfaces of portions that undergo a large change in the curvature of bending deformation in a cross-section of the floor panel 1 during vibration of the floor panel 1. Specifically, if the surfaces of the portions of the regions A1 to A12 surrounded by the vehicle body framework members that undergo a large change in the curvature of bending deformation in a cross-section of the floor panel 1 during vibration of the floor panel 1 have been coated with the vibration damping material 9, this means that the portions at which the vibration damping material 9 undergoes a large amount of stretching (the portions at which a large difference between the width dimension L1 and the width dimension L2 occurs) have been coated with the vibration damping material 9, so that the vibration damping function of the vibration damping material 9 can be effectively exerted.

It is the outer edge portions of the regions A1 to A12 surrounded by the vehicle body framework members that undergo a large change in the curvature of bending deformation in a cross-section of the floor panel 1 during vibration of the floor panel 1. These outer edge portions are namely the outer edge portions of the regions A1 to A12 extending along the long-side direction and the outer edge portions thereof extending along the short-side direction. Therefore, if the surface of the floor panel 1 has been coated with the vibration damping material 9 along only these outer edge portions, this means that the surfaces of the portions that undergo a large change in the curvature of bending deformation in a cross-section of the floor panel 1 during vibration of the floor panel 1 have been coated with the vibration damping material 9, so that the vibration damping function of the vibration damping material 9 can be effectively exerted.

In particular, as described above, the steps 8 of the floor panel 1 having the ridge lines R extending along the short-side direction of the regions A1 to A12 surrounded by the vehicle body framework members are arrayed along the long-side direction of the regions A1 to A12. Accordingly, during vibration of the floor panel 1, a central portion of the step 8 in the short-side direction undergoes a relatively small change in the curvature of bending deformation, while portions of the step 8 at both ends in the short-side direction (outer edge portions extending along the long-side direction) undergo a relatively large change in the curvature of bending deformation. Thus, these outer edge portions extending along the long-side direction constitute the portions that undergo the largest change in the curvature of bending deformation in a cross-section of the floor panel 1.

Figure 7:
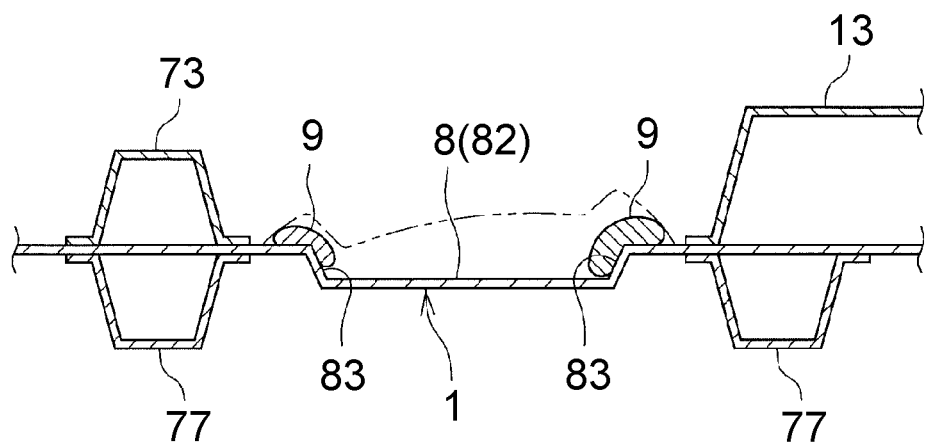
FIG. 7 is a view of section VII-VII in FIG. 2, illustrating how the floor panel behaves when vibration occurs.

FIG. 7 is a view of section VII-VII in FIG. 2, illustrating how the floor panel 1 behaves when vibration occurs. Reference signs 77 in FIG. 7 denote the floor reinforcement lower members. As shown in FIG. 7, during vibration of the floor panel 1 (in FIG. 7, a state of the floor panel 1 having undergone bending deformation so as to protrude upward as a result of vibration is indicated by the imaginary line), the central portion of the step 8 in the short-side direction (the left-right direction in FIG. 7) undergoes a relatively small change in the curvature of bending deformation, while portions of the step 8 at both ends in the short-side direction (the outer edge portions extending along the long-side direction; the portions on the right and left sides in FIG. 7) undergo a relatively large change in the curvature of bending deformation. Thus, these outer edge portions extending along the long-side direction (particularly portions around the upright parts 83) constitute portions that undergo the largest change in the curvature of bending deformation, in a cross-section of the floor panel 1. Therefore, if these outer edge portions extending along the long-side direction have been coated with the vibration damping material 9, this means that the surfaces of the portions that undergo the largest change in the curvature of bending deformation in a cross-section of the floor panel 1 have been coated with the vibration damping material 9.

Figure 8A:
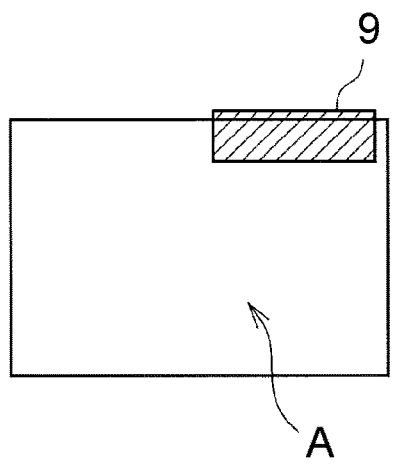
FIG. 8A is a plan view of one region of the floor panel, illustrating a coating region of the vibration damping material that is effective for a corresponding order of resonance mode.
Figure 8B:
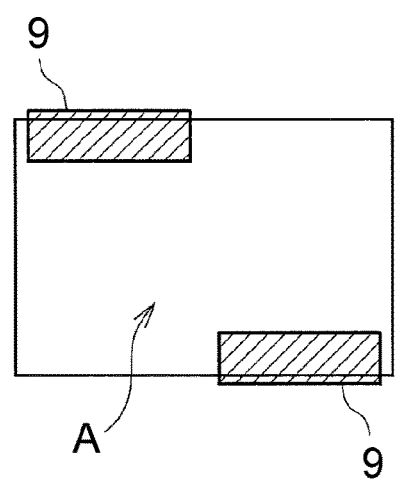
FIG. 8B is a plan view of one region of the floor panel, illustrating coating regions of the vibration damping material that are effective for a corresponding order of resonance mode.
Figure 8C:
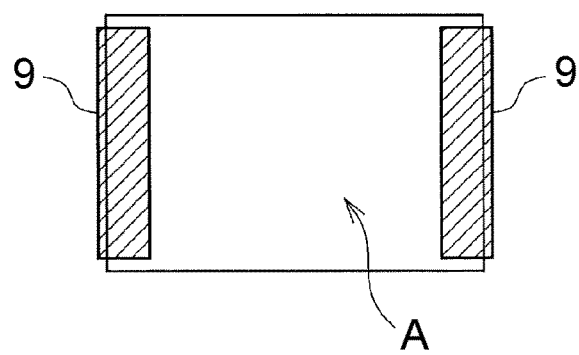
FIG. 8C is a plan view of one region of the floor panel, illustrating coating regions of the vibration damping material that are effective for a corresponding order of resonance mode.
Figure 8D:
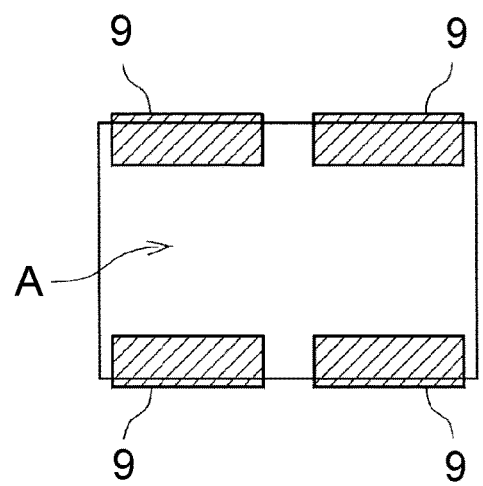
FIG. 8D is a plan view of one region of the floor panel, illustrating coating regions of the vibration damping material that are effective for a corresponding order of resonance mode.

There are a plurality of orders of resonance mode in which the floor panel 1 resonates. The coating regions of the vibration damping material 9 that allow the vibration suppressing effect to be advantageously exerted differ among these orders of resonance mode. FIG. 8A, FIG. 8B, FIG. 8C, and FIG. 8D are plan views of one region A of the floor panel 1, illustrating coating regions of the vibration damping material 9 that are effective for the respective orders of resonance mode. In other words, these drawings show the coating regions of the vibration damping material 9 that allow the vibration suppressing effect to be advantageously exerted in the respective orders of resonance mode. As shown in FIG. 8A, the vibration suppressing effect is exerted in a first-order resonance mode, when a part, closer to one side, of one outer edge portion extending along the long-side direction is coated with the vibration damping material 9. As shown in FIG. 8B, the vibration suppressing effect is exerted in a second-order resonance mode, when respective parts, closer to opposite sides, of both outer edge portions extending along the long-side direction are coated with the vibration damping material 9. As shown in FIG. 8C, the vibration suppressing effect is exerted in a third-order resonance mode, when both outer edge portions extending along the short-side direction are coated with the vibration damping material 9. As shown in FIG. 8D, the vibration suppressing effect is exerted in a fourth-order resonance mode, when both outer edge portions extending along the long-side direction are substantially entirely coated with the vibration damping material 9.

In view of these points, it is possible to select the coating regions of the vibration damping material 9 according to the resonance mode in which vibration is particularly desired to be suppressed. In this embodiment, however, to suppress vibration in every order of resonance mode, the surface of the floor panel 1 is coated with the vibration damping material 9 along each of the outer edge portions extending along the long-side direction and the outer edge portions extending along the short-side direction of the regions A1 to A12 of the floor panel 1 surrounded by the vehicle body framework members.

Figure 9:
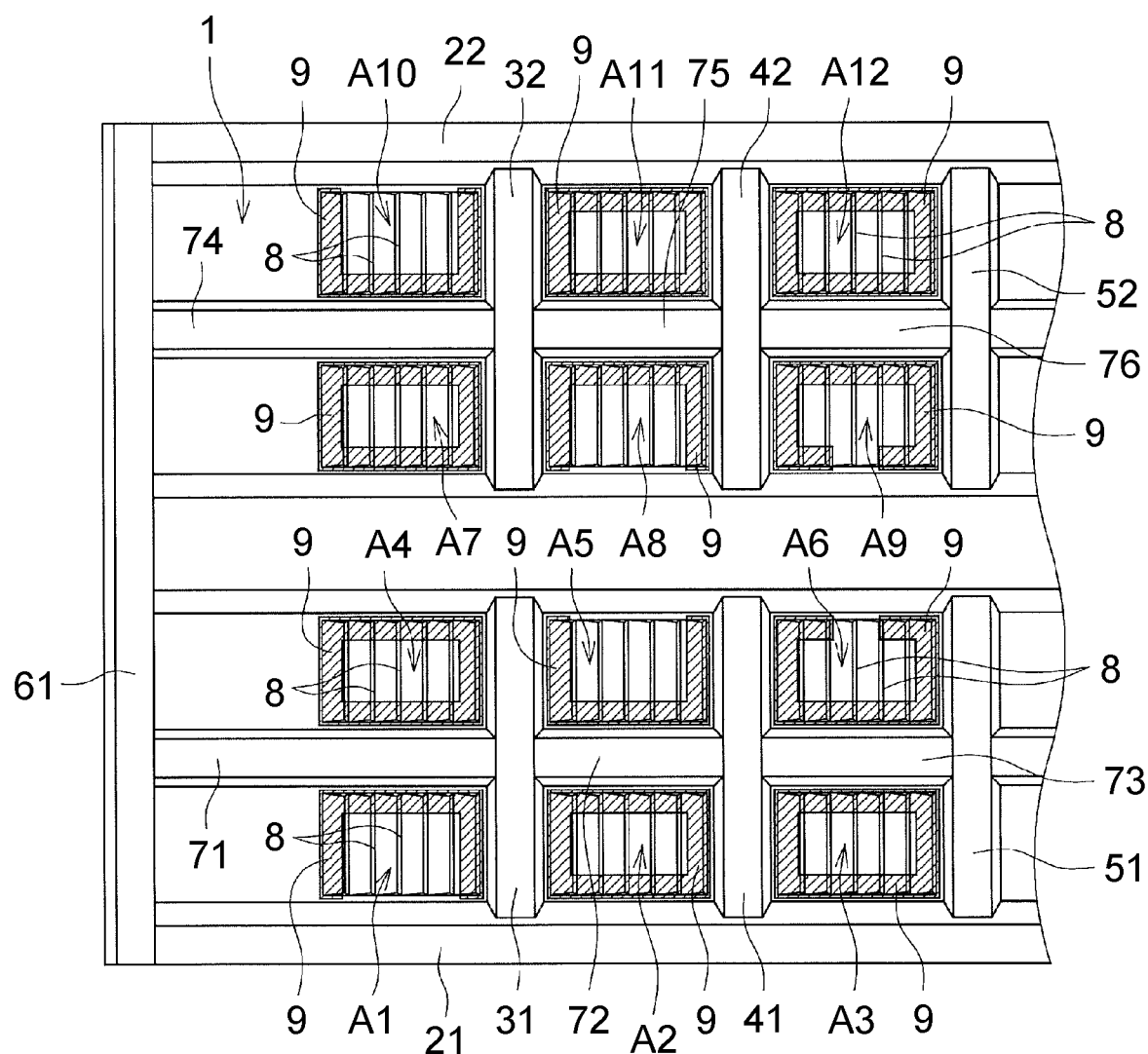
FIG. 9 is a view corresponding to FIG. 1, showing coating regions of the vibration damping material in the floor panel according to the embodiment.

Thus, in this embodiment, as shown in FIG. 9 (corresponding to FIG. 1 that shows the coating regions of the vibration damping material 9 in the floor panel 1), the floor panel 1 is coated with the vibration damping material 9 along each of the outer edge portions extending along the long-side direction and the outer edge portions extending along the short-side direction of the regions A1 to A12 surrounded by the vehicle body framework members (see the shaded portions in FIG. 9). The amount of coating of the vibration damping material 9 is determined such that the coating thickness of the vibration damping material 9 meets a coating thickness that is appropriately set within a range of about 1.0 mm to 5.0 mm based on experiment or simulation.

Among the outer edge portions of the regions A1 to A12 extending along the long-side direction and the outer edge portions thereof extending along the short-side direction as the coating regions of the vibration damping material 9 in the regions A1 to A12, those regions in which a projection protruding upward from the floor panel 1, an opening, etc. (not shown) are present are not coated with the vibration damping material 9. For example, in the regions A1, A10, the outer edge portions extending along the long-side direction on the outer side in the vehicle width direction are net coated with the vibration damping material 9. In the regions A5, A8, the outer edge portions extending along the long-side direction on the inner side in the vehicle width direction are also not coated with the vibration damping material 9. In the floor panel 1 shown in FIG. 7, of the amounts of coating of the vibration damping material 9 (the width dimensions of coating areas) on both sides in the vehicle width direction, the amount of coating of the vibration damping material 9 on the inner side in the vehicle width direction is set to be larger. This setting takes into account that the outer edge portion on the inner side in the vehicle width direction undergoes a larger change in the curvature of bending deformation in a cross-section of the floor panel 1 than the outer edge portion on the outer side.

As has been described above, in this embodiment, the steps 8 having the ridge lines R extending along the short-side direction of the regions A1 to A12 surrounded by the vehicle body framework members are arrayed along the long-side direction of the regions A1 to A12. Thus, the rigidity of the entire floor panel 1 is enhanced, and the resonance frequency of the floor panel 1 is thereby set higher. Moreover, the surfaces of the portions of the regions A1 to A12 surrounded by the vehicle body framework members that undergo a large change in the curvature of bending deformation in a cross-section of the floor panel 1 during vibration of the floor panel 1 (the outer edge portions of the regions A1 to A12 extending along the long-side direction and the outer edge portions thereof extending along the short-side direction) are coated with the vibration damping material 9. Thus, the vibration damping function of the vibration damping material 9 can be effectively exerted, and vibration can be sufficiently suppressed in the floor panel 1 as a whole, without the need for coating the surfaces of the central portions of the regions A1 to A12 with the vibration damping material 9. As a result, vibration of the floor panel 1 can be sufficiently suppressed, while the amount of vibration damping material used is reduced from that in a comparative example in which the vibration, damping material is applied evenly over the entire floor panel. For example, the amount of vibration damping material used can be reduced by about 30% from that in the comparative example. Thus, according to the embodiment, it is possible to sufficiently suppress vibration of the floor panel 1, while achieving a weight reduction of the vehicle body and thereby contributing to lowering the fuel consumption rate etc.

EXAMPLE OF EXPERIMENT

Next, an example of experiment that was conducted to confirm the above effects Will be described.

In this example of experiment, vibration of a resonance frequency was induced in each of the floor panel 1 according to the embodiment and a floor panel according to a comparative example (a floor panel of which substantially the entire upper surface is evenly coated with a vibration damping material), and the sound pressure sensitivity in each frequency band was measured.

Figure 10:
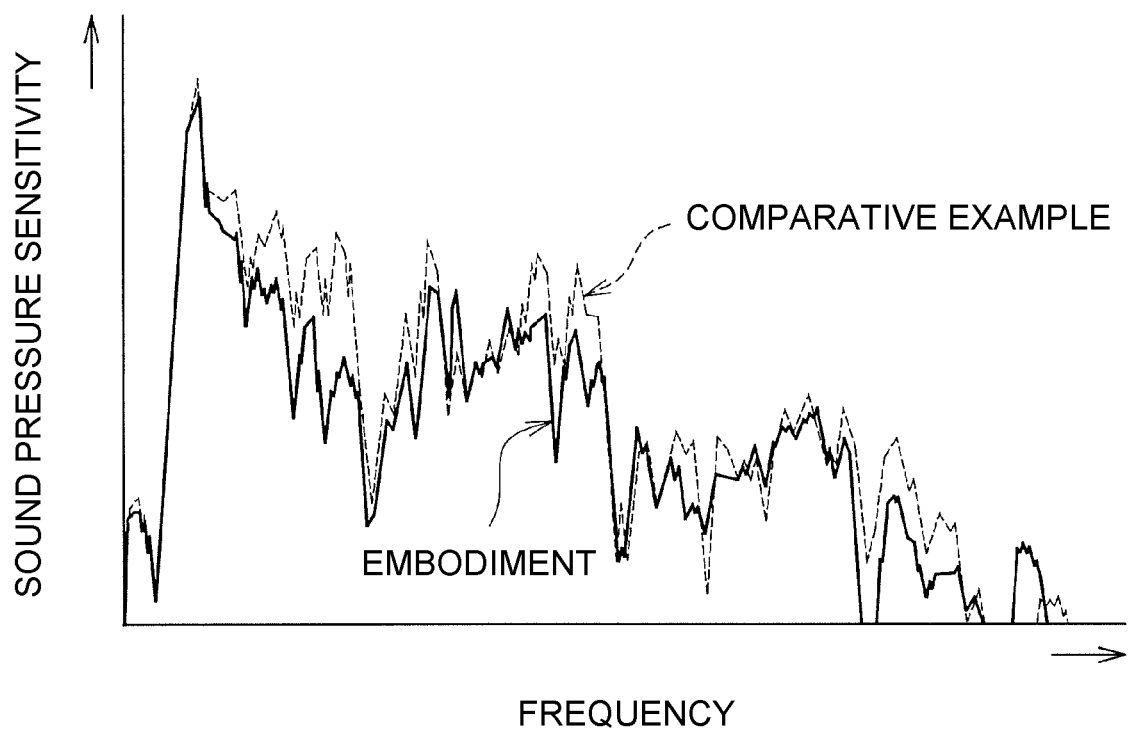
FIG. 10 is a graph showing a result of a vibration experiment on each of the floor panel according to the embodiment and a floor panel according to a comparative example.

FIG. 10 is a graph showing the result of this vibration experiment. The solid line in FIG. 10 shows the measurement result of the sound pressure sensitivity in each frequency band of the floor panel 1 according to the embodiment. The dashed line in FIG. 10 shows the measurement result of the sound pressure sensitivity in each frequency band of the floor panel according to the comparative example.

As is clear from FIG. 10, the floor panel 1 according to the embodiment bias lower sound pressure sensitivity in all frequency bands than the floor panel according to the comparative example, which confirms that the floor panel 1 can suppress abnormal noise attributable to vibration, such as booming noise, and can avoid giving an uncomfortable feeling to an occupant.

Modified Example 1

Next, Modified Example 1 will be described. This modified example is different from the embodiment in the coating regions of the vibration damping material 9. The structure is otherwise the same as in the embodiment, and therefore only the coating regions of the vibration damping material 9 will be described here.

Figure 11:
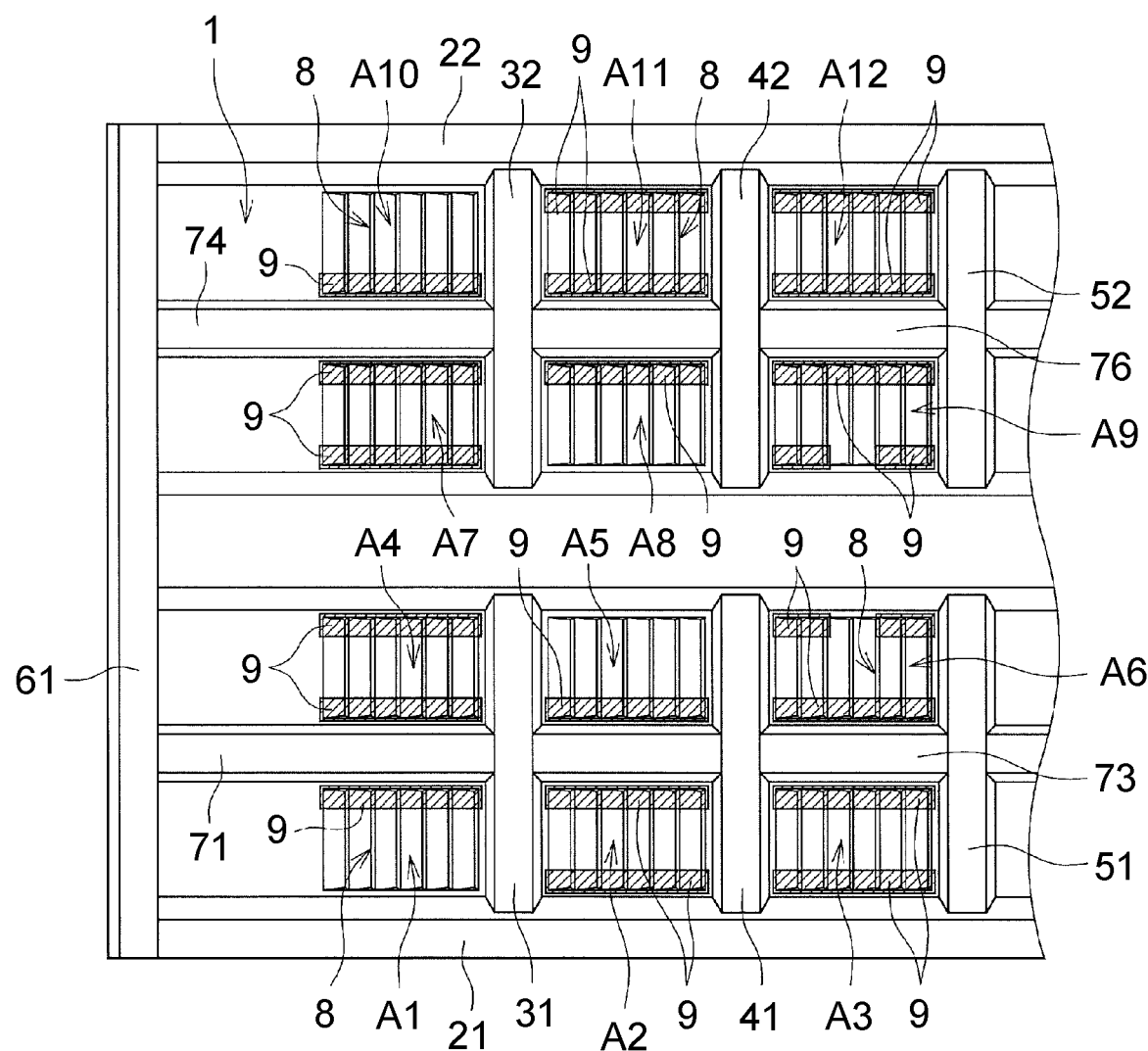
FIG. 11 is a view corresponding to FIG. 1, showing coating regions of the vibration damping material in the floor panel according to Modified Example 1.

FIG. 11 is a view corresponding to FIG. 1, showing the coating regions of the vibration damping material 9 in the floor panel 1 according to this modified example. As shown in FIG. 11, in this modified example, the surface of the floor panel 1 is coated with the vibration damping material 9 along only the outer edge portions extending along the long-side direction of the regions A1 to A12 of the floor panel 1 surrounded by the vehicle body framework members. Also in this modified example, among the outer edge portions of the regions A1 to A12 extending along the long-side direction, those regions in which a projection protruding upward from the floor panel 1, an opening, etc. (not shown) are present are not coated with the vibration damping material 9.

As described above, the steps 8 of the floor panel 1 having the ridge lines R (see FIG. 3) extending along the short-side direction of the regions A1 to A12 surrounded by the vehicle body framework members are arrayed along the long-side direction of these regions. Accordingly, during vibration of the floor panel 1, the central portion of the step 8 in the short-side direction undergoes a relatively small change in the curvature of bending deformation, while the portions of the step 8 at both ends in the short-side direction (the outer edge portions extending along the long-side direction) undergo a relatively large change in the curvature of bending deformation. Thus, these outer edge portions extending along the long-side direction constitute the portions that undergo the largest change in the curvature of bending deformation in a cross-section of the floor panel 1.

In view of this point, in this modified example, only these outer edge portions extending along the long-side direction are coated with the vibration damping material 9, to thereby coat the surfaces of the portions that undergo the largest change in the curvature of bending deformation in a cross-section of the floor panel 1 with the vibration damping material 9. In other words, the steps 8 are provided as the structure of the floor panel 1 so as to proactively create the portions that undergo the largest change in the curvature of bending deformation, and the vibration damping material 9 is applied to these portions.

According to the structure of this modified example, it is possible to exert a sufficient vibration damping function and sufficiently suppress vibration of the floor panel, while significantly reducing the amount of vibration damping material 9 used by not coating with the vibration damping material 9 the outer edge portions of the regions A1 to A12 extending along the short-side direction and the central portions of the regions A1 to A12. Thus, also in this modified example, it is possible to sufficiently suppress vibration of the floor panel 1, while achieving a weight reduction of the vehicle body and thereby contributing to lowering the fuel consumption rate etc.

Modified Example 2

Next, Modified Example 2 will be described. This modified example is also different from the embodiment in the coating regions of the vibration damping material 9. As the structure is otherwise the same as in the embodiment, only the coating regions of the vibration damping material 9 will be described here.

In this modified example, as in the above embodiment, the floor panel 1 is coated with the vibration damping material 9 along each of the outer edge portions extending along the long-side direction and the outer edge portions extending along the short-side direction of the regions A1 to A12 surrounded by the vehicle body framework members. In addition, the central portions of the regions A1 to A12 are also coated with the vibration damping material 9. The amount of coating of the vibration damping material 9 (the thickness dimension of the coating of the vibration damping material 9) at the central portions of the regions A1 to A12 is set to be smaller than the amount of coating of the vibration damping material 9 (the thickness dimension of the coating of the vibration damping material 9) along each of the outer edge portions of the regions A1 to A12 extending along the long-side direction and the outer edge portions thereof extending along the short-side direction. For example, the thickness dimension of the vibration damping material 9 at the central portions of the regions A1 to A12 is set to be about half the thickness dimension of the vibration damping material 9 at each of the outer edge portions of the regions A1 to A12 extending along the long-side direction and the outer edge portions thereof extending along the short-side direction. The ratio between these thickness dimensions is not limited to this example but set appropriately based on experiment or simulation.

Since the central portions of the regions A1 to A12 are also coated with the vibration damping material, the structure of this modified example can not only achieve the effects of the above embodiment but also exert the vibration damping function of the vibration damping material at the central portions of the regions A1 to A12 as well.

Modified Example 3

Next, Modified Example 3 will be described. This modified example is different from the above embodiment in the shape of the steps 8 formed in the floor panel 1. As the structure is otherwise the same as in the embodiment, only the shape of the steps 8 will be described here.

Although this is not shown, the steps 8 of the floor panel 1 in this modified example are formed by bending upward the panel material constituting the floor panel 1. Specifically, the steps 8 are formed by bending upward the panel material and have ridge lines extending along the short-side direction of the regions A1 to A12. These steps 8 are arrayed along the long-side direction of the regions A1 to A12.

Other Embodiments

The present disclosure is not limited to the above embodiment and modified examples but any modifications and applications included in the scope of claims and a scope equivalent to the scope of claims are possible.

For example, in the above embodiment and modified examples, the case where the number of the steps 8 formed in each of the regions A1 to A12 surrounded by the vehicle body framework members is six has been described. However, the number of the steps 8 in the present disclosure is not particularly limited and can be set arbitrarily.

In the above embodiment and modified examples, the case where the vibration damping material 9 used is of a coating type has been described. However, the present disclosure is not limited to this example, and a sheet material, such as an asphalt sheet, may be attached to the floor panel 1.

In the above embodiment and modified examples, the short-side direction and the long-side direction of the regions A1 to A12 are oriented in the vehicle width direction and the vehicle body front-rear direction, respectively. However, the present disclosure is not limited to this example, and the short-side direction and the long-side direction of the regions A1 to A12 may be oriented in the vehicle body front-rear direction and the vehicle width direction, respectively.

The present disclosure is applicable to a floor panel of which the rigidity is enhanced to set the resonance frequency higher and which is coated with a vibration damping material to damp vibration.

What is claimed is:

1. A vehicle body floor structure comprising:
a plurality of first vehicle body framework members extending along a vehicle body front-rear direction;
a plurality of second vehicle body framework members extending along a vehicle width direction;
a floor panel to which each of the first vehicle body framework members and the second vehicle body framework members is joined, the floor panel including a plurality of steps having ridge lines extending along a short-side direction of a first region, the steps being arrayed along a long-side direction of the first region, the first region being surrounded by the first vehicle body framework members that are adjacent to each other in the vehicle width direction and the second vehicle body framework members that are adjacent to each other in the vehicle body front-rear direction, the first region including outer edge portions extending along the long-side direction and outer edge portions extending along the short-side direction; and
a vibration damping material applied to a surface of the floor panel, the vibration damping material being applied along only at least one of the outer edge portions of the first region extending along the long-side direction among the outer edge portions extending along the long-side direction and the outer edge portions extending along the short-side direction.

2. The vehicle body floor structure according to claim 1, wherein:
the vibration damping material includes a first vibration damping material and a second vibration damping material, and a thickness of the first vibration damping material is set to be larger than a thickness of the second vibration damping material;
the first vibration damping material is applied to a surface of the floor panel along each of the outer edge portions extending along the long-side direction and the outer edge portions extending along the short-side direction of the first region of the floor panel; and
the second vibration damping material is applied to a surface of the floor panel at a central portion of the first region of the floor panel.

3. The vehicle body floor structure according to claim 1, wherein the ridge lines of the steps continue from one outer edge portion of the first region extending along the long-side direction to the other outer edge portion of the first region extending along the long-side direction.

4. The vehicle body floor structure according to claim 1, wherein:
the steps include a plurality of steep parts, a plurality of panel parts, and a plurality of upright parts;

the steep parts have a larger inclination angle relative to a horizontal direction than the panel parts;

the panel parts are each laid between the steep parts and have a smaller inclination angle relative to the horizontal direction than the steep parts; and the upright parts are located between edges of the panel parts at both ends in the vehicle width direction and a surface of the floor panel.

5. The vehicle body floor structure according to claim 4, wherein the vibration damping material is applied to the upright parts.

6. The vehicle body floor structure according to claim 1, wherein:

a second region is surrounded by the first vehicle body framework members that are adjacent to each other in the vehicle width direction and the second vehicle body framework members that are adjacent to each other in the vehicle body front-rear direction, the second region being different region from the first region; and a shape of an application region to which the vibration damping material is applied in the second region is different from a shape of an application region to which the vibration damping material is applied in the first region.

7. A vehicle body floor structure comprising:

a plurality of first vehicle body framework members extending along a vehicle body front-rear direction;

a plurality of second vehicle body framework members extending along a vehicle width direction;

a floor panel to which each of the first vehicle body framework members and the second vehicle body framework members is joined, the floor panel including a plurality of steps having ridge lines extending along a short-side direction of a first region, the steps being arrayed along a long-side direction of the first region, the first region being surrounded by the first vehicle body framework members that are adjacent to each other in the vehicle width direction and the second vehicle body framework members that are adjacent to each other in the vehicle body front-rear direction, the steps include a plurality of steep parts, a plurality of panel parts, and a plurality of upright parts, the steep parts have a larger inclination angle relative to a horizontal direction than the panel parts, the panel parts are each laid between the steep parts and have a smaller inclination angle relative to the horizontal direction than the steep parts, and the upright parts are located between edges of the panel parts at both ends in the vehicle width direction and a surface of the floor panel; and a vibration damping material applied to a surface of the floor panel, the vibration damping material being applied along at least one outer edge portion of the first region among outer edge portions extending along the long-side direction and outer edge portions extending along the short-side direction.

8. The vehicle body floor structure according to claim 7, wherein:

the vibration damping material includes a first vibration damping material and a second vibration damping material, and a thickness of the first vibration damping material is set to be larger than a thickness of the second vibration damping material;

the first vibration damping material is applied to a surface of the floor panel along each of the outer edge portions extending along the long-side direction and the outer edge portions extending along the short-side direction of the first region of the floor panel; and the second vibration damping material is applied to a surface of the floor panel at a central portion of the first region of the floor panel.

9. The vehicle body floor structure according to claim 7, wherein the ridge lines of the steps continue from one outer edge portion of the first region extending along the long-side direction to the other outer edge portion of the first region extending along the long-side direction.

10. The vehicle body floor structure according to claim 7, wherein the vibration damping material is applied to the upright parts.

11. A vehicle body floor structure comprising:

a plurality of first vehicle body framework members extending along a vehicle body front-rear direction;

a plurality of second vehicle body framework members extending along a vehicle width direction;

a floor panel to which each of the first vehicle body framework members and the second vehicle body framework members is joined, the floor panel including a plurality of steps having ridge lines extending along a short-side direction of a first region, the steps being arrayed along a long-side direction of the first region, the first region being surrounded by the first vehicle body framework members that are adjacent to each other in the vehicle width direction and the second vehicle body framework members that are adjacent to each other in the vehicle body front-rear direction; and a vibration damping material applied to a surface of the floor panel, the vibration damping material being applied along at least one outer edge portion of the first region among outer edge portions extending along the long-side direction and outer edge portions extending along the short-side direction;

wherein a second region is surrounded by the first vehicle body framework members that are adjacent to each other in the vehicle width direction and the second vehicle body framework members that are adjacent to each other in the vehicle body front-rear direction, the second region being different region from the first region; and wherein a shape of an application region to which the vibration damping material is applied in the second region is different from a shape of an application region to which the vibration damping material is applied in the first region.

12. The vehicle body floor structure according to claim 11, wherein:

the vibration damping material includes a first vibration damping material and a second vibration damping material, and a thickness of the first vibration damping material is set to be larger than a thickness of the second vibration damping material;

the first vibration damping material is applied to a surface of the floor panel along each of the outer edge portions extending along the long-side direction and the outer edge portions extending along the short-side direction of the first region of the floor panel; and the second vibration damping material is applied to a surface of the floor panel at a central portion of the first region of the floor panel.

13. The vehicle body floor structure according to claim 11, wherein the ridge lines of the steps continue from one outer edge portion of the first region extending along the long-side direction to the other outer edge portion of the first region extending along the long-side direction.

14. The vehicle body floor structure according to claim 11, wherein:
- the steps include a plurality of steep parts, a plurality of panel parts, and a plurality of upright parts;
- the steep parts have a larger inclination angle relative to a horizontal direction than the panel parts;
- the panel parts are each laid between the steep parts and have a smaller inclination angle relative to the horizontal direction than the steep parts; and
- the upright parts are located between edges of the panel parts at both ends in the vehicle width direction and a surface of the floor panel.

15. The vehicle body floor structure according to claim 11, wherein the vibration damping material is applied to the upright parts.

* * * * *

UNITED STATES PATENT AND TRADEMARK OFFICE
CERTIFICATE OF CORRECTION

PATENT NO. : 10,773,660 B2
APPLICATION NO. : 16/196782
DATED : September 15, 2020
INVENTOR(S) : Takayoshi Shigihara It is certified that error appears in the above-identified patent and that said Letters Patent is hereby corrected as shown below:

On the Title Page

Item (72), delete "Toyota" and insert --Toyota-shi Aichi-ken--, therefor.

In the Specification

In Column 1, Line(s) 20, delete "2909" and insert --2009--, therefor.

In Column 3, Line(s) 7, delete "clamping" and insert --damping--, therefor.

In Column 3, Line(s) 37, delete "dating" and insert --during--, therefor.

In Column 9, Line(s) 58, after "deformation", delete ",".

In Column 10, Line(s) 61, delete "net" and insert --not--, therefor.

In Column 11, Line(s) 15, after "enhanced", delete ",".

In Column 11, Line(s) 34, after "vibration", delete ",".

In Column 11, Line(s) 65, delete "bias" and insert --has--, therefor.

Signed and Sealed this
Fifth Day of January, 2021

Andrei Iancu
*Director of the United States Patent and Trademark Office*